United States Patent

Espen

[15] 3,705,344
[45] Dec. 5, 1972

[54] WIDEBAND CONSTANT AMPLITUDE-VARIABLE PHASE CIRCUIT

[72] Inventor: David A. Espen, Phoenix, Ariz.

[73] Assignee: Sperry Rand Corporation, New York, N.Y.

[22] Filed: Nov. 8, 1971

[21] Appl. No.: 196,294

[52] U.S. Cl. .................323/109, 318/690, 318/691, 323/122, 324/86, 340/198
[51] Int. Cl. .............................................G08c 19/00
[58] Field of Search ......318/654, 690, 691; 323/108, 323/109, 122; 324/86; 328/133, 155; 340/197, 198, 211

[56] References Cited

UNITED STATES PATENTS 3,548,284   12/1970   Espen....................................318/691
3,646,537   2/1972   Erspamer et al. ....................340/197

Primary Examiner—A. D. Pellinen
Attorney—Howard P. Terry

[57] ABSTRACT

An electronic circuit for converting three-wire synchro-type amplitude modulated carrier frequency signals to an equivalent two-wire constant amplitude-variable phase signal including frequency compensating means for maintaining a prescribed relation between certain resistive and reactive components of the circuit to assure accuracy of the output phase information over a wide range of carrier frequencies and component values.

9 Claims, 3 Drawing Figures

WIDEBAND CONSTANT AMPLITUDE-VARIABLE PHASE CIRCUIT

BACKGROUND OF THE INVENTION

1. Field of the Invention

The present invention relates generally to electronic circuits for converting three-wire synchro-type analog signals to an equivalent two-wire constant amplitude-variable phase signal in which the phase is representative of the angle information conveyed by the three-wire signals, and more particularly to improvements in such converter circuits for assuring accuracy of the phase data over a wide range of operational frequencies.

2. Description of the Prior Art.

A prior art circuit to which the invention relates is disclosed in U.S. Pat. application Ser. No. 25,004 filed Apr. 2, 1970, Now U.S. Pat. No. 3,617,863, in the name of David A. Espen for "Constant Amplitude-Variable Phase Circuit" and assigned to the instant assignee. As explained in the prior application, conversion of amplitude modulated three-wire synchro or flux valve sensor signals to an equivalent constant amplitude-variable phase signal provides insensitivity to changes in either the magnitude of the electrical excitation applied to the sensor or magnetic field intensity in the case of a flux valve. The prior art circuit achieves the desired conversion, however, only at a single predetermined frequency in accordance with the selected values of certain resistive and reactive components of the circuit. It is the principal object of the present invention to provide frequency compensating means for modifiying the prior circuit so that accurate three-wire to two-wire conversion may be obtained over a wide frequency range.

SUMMARY OF THE INVENTION

A preferred embodiment of the present invention incorporates controlled variable impedance means coupled into the prior art constant amplitude-variable phase circuit in a manner to maintain the voltages at two discrete points of the circuit in a predetermined ratio irrespective of changes in either the operating frequency or values of the circuit components. By maintaining a predetermined voltage ratio between the two discrete points, a constant relationship is established between particular resistive and reactive components of the circuit as required to obtain a transfer function which satisfies the conditions for converting the three-wire amplitude modulated data to an equivalent constant amplitude-variable phase signal.

More specifically, as described with respect to the preferred embodiment of the prior application and as will be further described with respect thereto in the subsequent detailed description, a fixed relationship must be maintained between a particular resistor and the reactance associated with a certain capacitor incorporated in the converter circuit to assure that the phase information of the constant amplitude-variable phase signal accurately represents the angle data contained in the three-wire amplitude modulated signals. Changes in the carrier frequency of the three-wire signals, however, cause the capacitive reactance to vary and thus disrupt the condition required to be established between the resistor and capacitor. The same circumstances will prevail for changes in the values of the circuit components. By the provision of apparatus constructed in accordance with the principles of the present invention, these undesired conditions are avoided. The inventive circuit accomplishes this result by continuously measuring the voltage at two points associated with the aforementioned resistor and capacitor of the converter circuit. These measured voltages are compared and any deviation from a prescribed difference therebetween is used as a control signal to regulate the impedance of the resistance-capacitance circuit so that the desired voltage ratio is preserved thereby assuring that a fixed relation is maintained between the resistance and capacitive reactance so that the three-wire signals are accurately converted to an equivalent signal of constant amplitude and variable phase.

DESCRIPTION OF THE PREFERRED EMBODIMENT

Figure 1:
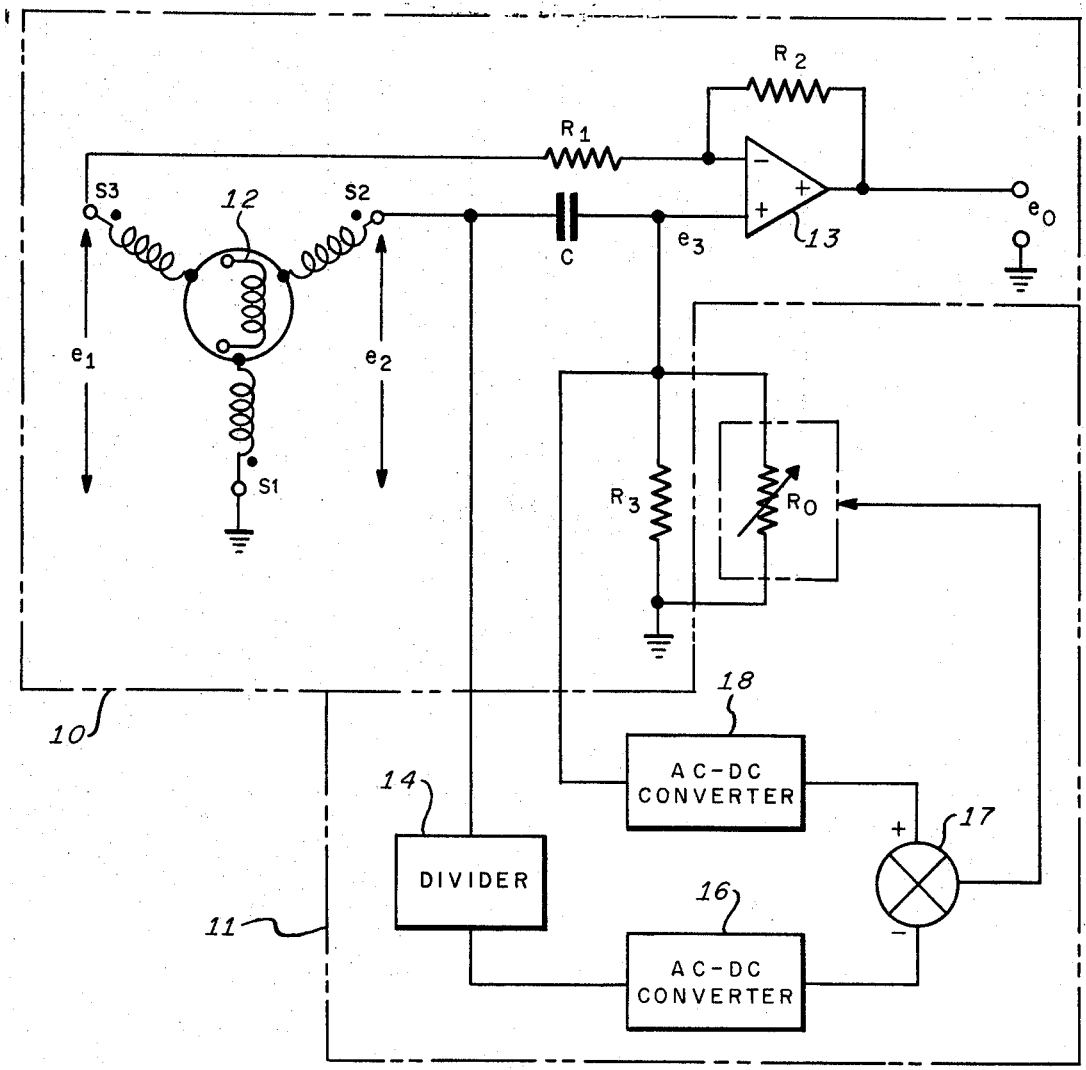
FIG. 1 is a block diagram of a three-wire to two-wire frequency compensated constant amplitude-variable phase circuit constructed according to the principles of the present invention.

Referring to FIG. 1, the prior art constant amplitude-variable phase circuit referred to hereinbefore with reference to U.S. Pat. No. 3,617,863 is shown in dashed line section 10 while the improvement portion of the circuit provided by the present invention is shown in dashed line section 11. The voltages produced in the synchro stator winding S1, S2 and S3 of the prior art circuit in response to electrical excitation supplied to the synchro rotor 12 and rotation thereof relative to the stator windings, may be represented as:

$$V_{S2} = E \cos \theta \sin wt \qquad (1a)$$

$$V_{S3} = E \cos (\theta - 120) \sin wt \qquad (1b)$$

$$V_{S1} = E \cos (\theta - 240) \sin wt \qquad (1c)$$

where $w$ is the angular frequency in radians per second of the carrier frequency excitation applied to the synchro rotor, $E$ is the maximum value of the voltage induced in the stator windings and $\theta$ is the counterclockwise angular displacement of the rotor relative to stator winding S2. As indicated in the FIGURE by the dot adjacent each winding, the extending ends of the stator windings all have the same instantaneous carrier frequency phase. The voltages $e_1$ and $e_2$ are determined from equations (1a), (1b) and (1c) as:

$$e_1 = V_{S3} - V_{S1} = \sqrt{3} E \sin \theta \sin wt \qquad (2a)$$

and $$e_2 = V_{S2} - V_{S1} = \sqrt{3} E \sin (\theta + 60) \sin wt \qquad (2b)$$

The transfer function of the circuit comprising the operational amplifier 13, resistor R1 connected from synchro terminal S3 to the inverting input terminal of the amplifier, capacitor C connected from synchro terminal S2 to the non-inverting input terminal of the amplifier, resistor R3 connected from synchro terminal S1 to the non-inverting input terminal and resistor R2 connected between the amplifier input and output terminals has a transfer function of the form:

$$e_o = -\frac{R2}{R1} e_1 + \left(\frac{R2}{R1}+1\right)\left(\frac{1}{1-\frac{j}{wcR3}}\right) e_2 \quad (3)$$

As explained in the aforementioned Espen patent, this transfer function converts the three-wire inputs derived from the synchro stator windings to a constant amplitude-variable phase signal of the form:

$$e_o = -(3E/2)\cos(wt - \theta + 30) \quad (4)$$

More specifically, where $R1 = R2$ and $X_C = \sqrt{3} R3$ equation (3) becomes $$e_0 = -e_1 + \frac{2}{1-j\sqrt{3}} e_2 \quad (3')$$

Substitution of equations (2a) and (2b) into equation (3') and appropriate manipulation thereof yields equation (4). Equation (4) indicates that the output voltage has the desired constant amplitude $3E/2$ and variable phase $(wt-\theta+30)$ where the carrier frequency $w$ is phase shifted by a variable amount $\theta$ corresponding to the angle data input obtained from the synchro.

It will be noted from equation (4) that the output signal leads the synchro carrier frequency excitation by 30°. This can be easily compensated for if desired simply by introducing a corresponding fixed phase shift into the synchro rotor excitation. As is also explained in the prior application, the above stated relation between the various components is not unique or essential. Other combinations of the values of $R1$, $R2$, $R3$, $C$ and $w$ may also be used in the transfer function equation (3) which will provide a constant amplitude-variable phase signal having the form of equation (4). These generalizations also apply to the improvement afforded by the present invention. In addition, it should be understood that an operational amplifier having a differential input stage is not essential for satisfactory operation. A single junction input amplifier may also be employed in conjunction with an appropriate passive component circuit configuration to meet the operational requirements of both the prior art constant amplitude-variable phase circuit and the related improvement which will be described momentarily.

The feature of importance from the viewpoint of the present invention is the relationship existing between resistor $r3$ and the capacitor $C$, namely $X_C = (1/jwc) = 3 R3$. It is readily apparent from this relationship that a change in either the component values or the carrier frequency of the three-wire signals will impair the transfer characteristic with resulting degradation of the phase information in the output signal $e_0$. The invention precludes such occurrences by the provision of variable resistor $R_0$ connected in parallel with resistor $R3$ to maintain $X_C = \sqrt{3}R3'$ where $R3'$ is the equivalent resistance of the parallel combination of $R3$ and $R_0$.

Designating the voltage at the junction of resistor $R3$ and capacitor $C$ as $e_3$ with reference to ground, it is easily determined from simple voltage division circuit analysis that the ratio of $e_2$ to $e_3$ is $$e_2/e_3 = 1 + (1/jwCR3b5.) \quad (5)$$

and the magnitude of $e_2$ to $e_3$ is therefore represented as $$\left|\frac{e_2}{e_3}\right| = \sqrt{1+\left(\frac{1}{wCR3'}\right)^2} \quad (6)$$

For the condition where $|e_2/e_3| = 2$ it is seen that $X_c = \sqrt{3} R3'$. Thus, by varying resistor $R_o$ so that $e_2$ is held equal to $2e_3$, the relationship between $X_c$ and $R3'$ is maintained so as to provide the appropriate transfer function to the three-wire input signals for conversion to an equivalent constant amplitude-variable phase signal. Operation in the foregoing manner is performed by applying signal $e_2$ to a divider 14 to produce a signal $e_2/2$ which, in turn, is fed through an a.c. to d.c. converter 16 and thence into comparator 17. Likewise, voltage $e_3$ is fed through an a.c. to d.c. converter 18 into the comparator where it is differentially combined with the voltage from converter 16. When $e_2/2=e_3$, the comparator output is zero. Any deviation from this condition, however, produces an error signal of one polarity or the other, depending on the relative magnitudes of $e_2$ and $e_3$, which is used to control the magnitude of resistor $R_0$. Before proceeding to a more detailed discussion of the variable resistance control aspect of the invention, it should first be understood that any suitable means may be used for controlling the voltage ratio $e_2/e_3$ aside from the illustrated technique of varying a resistance in parallel with the resistor $R3$. For example, $R3$ itself may be a variable resistor or, alternatively, means may be provided for varying the capacitance as by the use of voltage variable capacitors. Moreover, it will be readily appreciated by those skilled in the art that the precise voltage ratio required to be maintained between $e_2$ and $e_3$ will depends upon the particular arrangement of resistive and reactive components employed to provide the desired transfer function.

Figure 3:
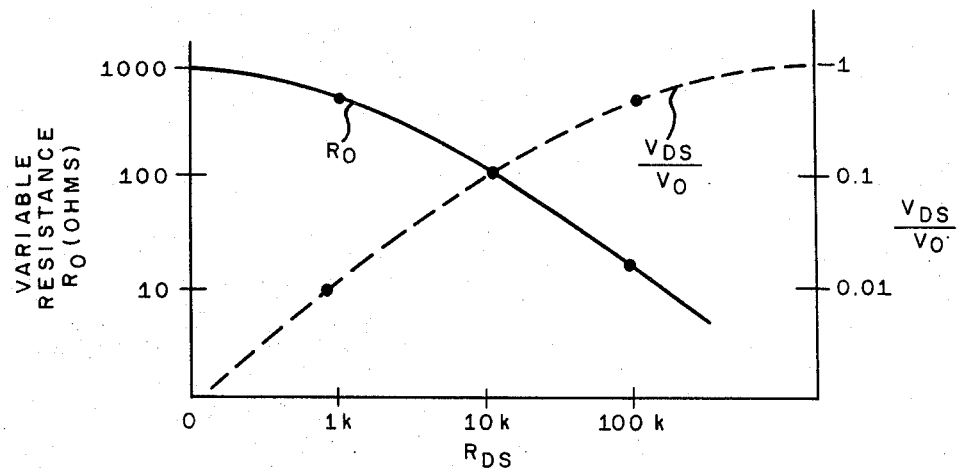
FIG. 3 is a graph depicting the relationship between resistance and voltage parameters applicable to the variable resistance circuit incorporated in the preferred embodiment of FIG. 2.
Figure 2:
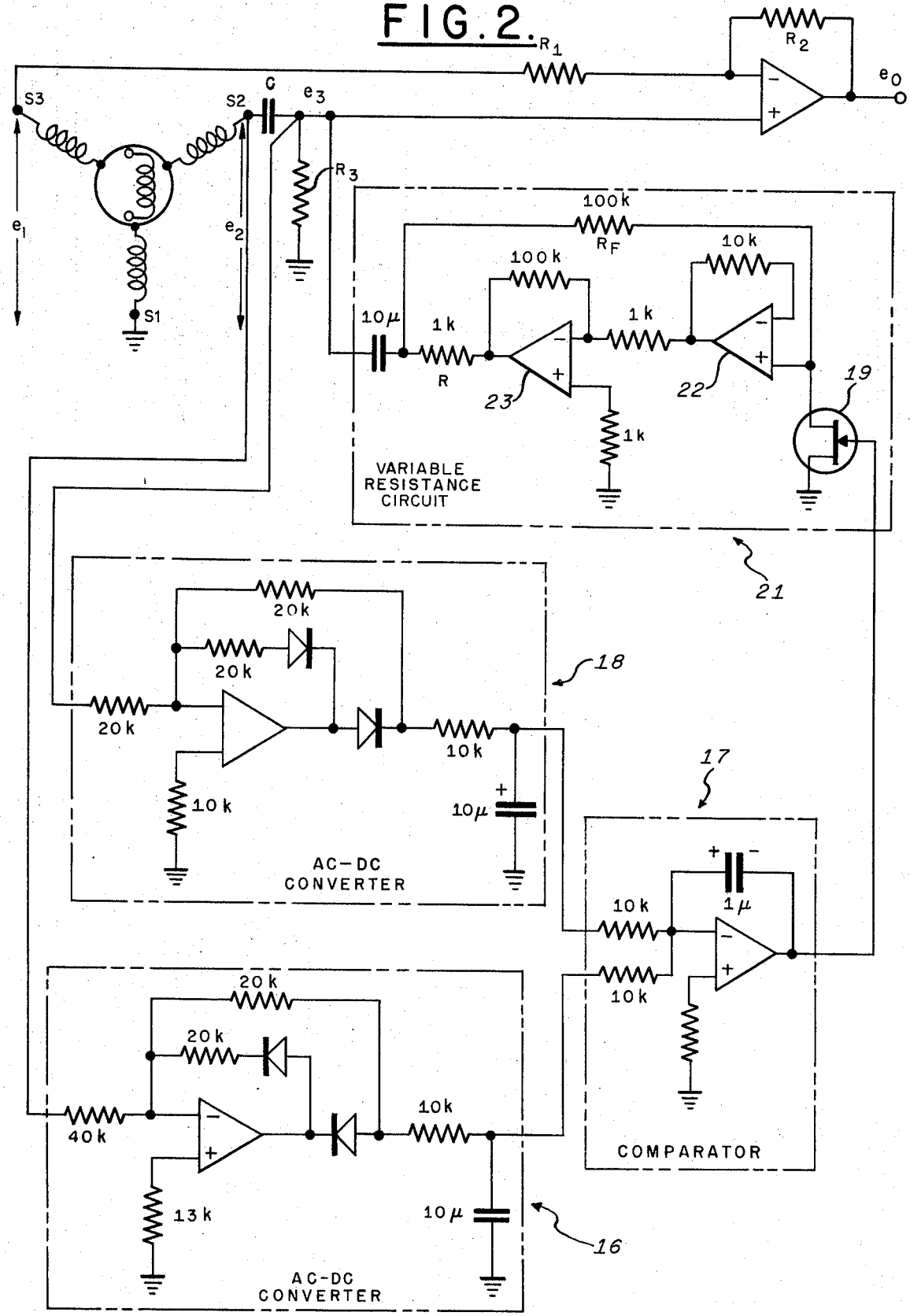
FIG. 2 is an electrical schematic of a preferred embodiment of the circuit shown in FIG. 1.

A detailed schematic of a frequency compensating circuit for providing frequency compensation in accordance with the present invention is shown in FIG. 3. The a.c. to d.c. converters 16 and 18 incorporate precision rectifier circuits and lowpass RC filters to produce d.c. out put voltages inverted in polarity relative to one another for application to the comparator 17, the voltage division required for $e_2$ being obtained by appropriate selection of the input and feedback resistors used in converter 16 as compared to those used in converter 18. The comparator 17 comprises a conventional long time constant electronic integrator, the output of which is applied as a control signal to the gate of junction field effect transistor 19 in variable resistance circuit 21.

The a.c. output resistance $R_0$ of the variable resistance circuit is equal to $V_0/I_0$ which is regulated by the gate voltage of the field effect transistor so as to make the parallel combination of $R3$ and $R_0$ equal to $X_{Cl} \sqrt{3}$. The use of field effect transistors as variable impedance elements is well known but such use is generally limited to very low voltage applications because of distortion which developes as the drain-source voltage of the transistor increases. The use of operational amplifiers in combination with the field effect transistor circumvents this problem. In the illustrated circuit, the drain-source resistance of the field effect transistor is directly controlled by the gate voltage applied thereto to vary the feedback around the fixed gain of the operational amplifier stages 22 and 23 and resistor $R$. Changes in the feedback have the effect of changing the closed loop output resistance $R_0$ which can be shown to be represented mathematically as $$R_0 \simeq R \frac{\left(1+\frac{R_{DS}}{R_F}\right)}{\left(1+\frac{R_{DS}A}{R_F}\right)} \quad (7)$$

where $R_{DS}$ is the drain-source resistance of the field effect transistor, $R_F$ is the feedback resistance around the operational amplifier stages and is assumed to have a value much greater than the magnitude of resistor $R$ connected to the output of stage 23, an $A$ is the gain of stage 23 which is assumed to be much greater than unity. The relationship between the voltage $V_0$ across the variable output resistance $R_0$ and the field effect transistor drain-source voltage $V_{DS}$ is readily ascertained to be $$(V_{DS}/V_D) 32 R_{DS}/(R_F + R_{DS})$$

FIG. 3 is a graph depicting the variable output resistance and the ratio of the field effect transistor drain-source voltage to the output voltage as functions of the drain-source resistance for assumed values of $A$ and $R_F$ as stated above. As is clearly indicated in the graph, there is a range of variable resistance values for which $V_0$ is greater than $V_{DS}$ thus substantiating the fact that distortion can be substantially avoided at voltage levels higher than can be achieved with the transistor alone by using the operational amplifiers in combination with the transistor.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In an electronic circuit for converting three-wire synchrotype angle information input signals to an equivalent constant amplitude-variable phase signal including an operational amplifier in combination with passive, resistive and reactive components so constructed and arranged as to provide a signal at the operational amplifier output having a variable phase representative of the angle information of the input signals, the improvement comprising means for measuring the signal amplitude at one of the three-wire inputs, means for measuring the signal amplitude at an input terminal of the operational amplifier, means for comparing the measured signals to produce a control signal representative of a difference therebetween, and means responsive to the control signal for varying the impedance of the passive components to maintain a fixed voltage ratio between said one of the three-wire inputs and said amplifier input terminal.

2. The apparatus of claim 1 wherein each of the measuring means comprises an a.c. to d.c. converter for converting the measured a.c. voltages to a proportional d.c. voltage for application to the comparing means.

3. The apparatus of claim 1 wherein the construction and arrangement of the passive components is such as to provide a transfer characteristic from the three-wire inputs to the amplifier output of the form $e_o = -e_1 + (2/1 - j\sqrt{3}e_2$ where $e_1$ is the voltage across a first pair of the three-wire inputs, $e_2$ is the voltage across a second pair of the three-wire inputs and $e_o$ is the amplifier output voltage.

4. The apparatus of claim 3 wherein each of the measuring means comprises an a.c. to d.c. converter for producing a corresponding d.c. voltage proportional to the amplitude of the measured voltage.

5. The apparatus of claim 1 wherein the operational amplifier has a differential amplifier input stage and the passive components include first impedance means connected between one of the three-wire inputs and one of the differential amplifier inputs, second impedance means connected between a second of the three-wire inputs and the other differential amplifier input, third impedance means connected between a differential amplifier input and the operational amplifier output, and fourth impedance means connected between the third of the three-wire inputs and a differential amplifier input.

6. The apparatus of claim 5 wherein the first and third impedance means are coupled to one differential amplifier input and the second and fourth impedance means are coupled to the other differential amplifier input, and the control signal is operative to vary the impedance ratio of the second and fourth impedance means.

7. The apparatus of claim 6 wherein the first, second and third impedance means are respective first, second and third resistances and the fourth impedance means is a capacitive reactance.

8. The apparatus of claim 7 wherein the control signal is operative to maintain a 2 to 1 voltage ratio between the third of the three-wire inputs and said other differential amplifier input.

9. The apparatus of claim 8 wherein the prescribed voltage ratio is maintained by varying a resistance connected in parallel with said second resistance.

* * * * *